(12) United States Patent
Kim et al.

(10) Patent No.: US 7,781,784 B2
(45) Date of Patent: Aug. 24, 2010

(54) DISPLAY APPARATUS WITH COLOR PIXELS

(75) Inventors: Sang-Il Kim, Yongin-si (KR); Son-Uk Lee, Yongin-si (KR); Nam-Seok Roh, Seongnam-si (KR); Jeong-Kuk Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/116,312

(22) Filed: May 7, 2008

(65) Prior Publication Data

US 2008/0277664 A1 Nov. 13, 2008

(30) Foreign Application Priority Data

May 7, 2007 (KR) ................ 10-2007-0044108
Jun. 20, 2007 (KR) ................ 10-2007-0060579

(51) Int. Cl.
*H01L 29/20* (2006.01)
*H01L 33/00* (2010.01)
*H01L 29/201* (2006.01)
*H01L 29/04* (2006.01)
*H01L 29/10* (2006.01)
*H01L 31/036* (2006.01)
*H01L 31/0376* (2006.01)
*H01L 31/20* (2006.01)
*H01L 29/15* (2006.01)
*H01L 31/00* (2006.01)
*H01L 31/062* (2006.01)

(52) U.S. Cl. ............................. 257/89; 257/59; 257/72; 257/90; 257/222; 257/258; 257/291; 257/440; 257/E31.001; 257/E33.001

(58) Field of Classification Search ................... 257/59, 257/72, 222, 258, 291, E31.001, E33.001, 257/89–90, 440
See application file for complete search history.

(56) References Cited

U.S. PATENT DOCUMENTS

| | | | | |
|---|---|---|---|---|
| 6,541,130 | B2 * | 4/2003 | Fukuda | 428/690 |
| 6,852,562 | B1 * | 2/2005 | Hopper et al. | 438/57 |
| 6,989,876 | B2 * | 1/2006 | Song et al. | 349/109 |
| 7,142,243 | B2 * | 11/2006 | Dobashi | 348/340 |
| 7,173,368 | B2 * | 2/2007 | Koo et al. | 313/498 |
| 7,206,042 | B2 * | 4/2007 | Yang et al. | 349/106 |
| 7,339,639 | B2 * | 3/2008 | Nakano et al. | 349/106 |
| 7,436,465 | B2 * | 10/2008 | Moriya et al. | 349/48 |
| 7,440,055 | B2 * | 10/2008 | Nam et al. | 349/114 |
| 2003/0058521 | A1 * | 3/2003 | Kawai | 359/296 |

(Continued)

FOREIGN PATENT DOCUMENTS

JP 2004271652 9/2004

(Continued)

*Primary Examiner*—Ida M Soward
(74) *Attorney, Agent, or Firm*—Cantor Colburn LLP

(57) ABSTRACT

A display apparatus includes pixel electrodes disposed on a first base substrate, a second base substrate which faces the first base substrate, color pixels disposed on the second base substrate, the color pixels correspond to the pixel electrodes in a one-to-one correspondence, each color pixel partially covers the corresponding pixel electrode, a common electrode disposed on the second base substrate to cover the pixel electrodes and an electrophoretic layer including a plurality of electrophoretic particles, the electrophoretic layer being interposed between the pixel electrodes and the common electrode.

22 Claims, 12 Drawing Sheets

U.S. PATENT DOCUMENTS

| | | | |
|---|---|---|---|
| 2004/0021804 A1* | 2/2004 | Hong et al. | 349/43 |
| 2005/0248828 A1* | 11/2005 | Katase | 359/296 |
| 2006/0139305 A1* | 6/2006 | Zhou et al. | 345/107 |
| 2006/0152473 A1* | 7/2006 | Johnson et al. | 345/107 |
| 2006/0221050 A1* | 10/2006 | Sakamoto et al. | 345/107 |
| 2007/0153176 A1* | 7/2007 | Yang et al. | 349/114 |
| 2007/0262309 A1* | 11/2007 | Kim | 257/59 |
| 2008/0165121 A1* | 7/2008 | Suh | 345/107 |
| 2008/0266244 A1* | 10/2008 | Bai et al. | 345/107 |
| 2009/0039495 A1* | 2/2009 | Yamashita et al. | 257/690 |
| 2010/0044728 A1* | 2/2010 | Domoto | 257/89 |

FOREIGN PATENT DOCUMENTS

| | | |
|---|---|---|
| JP | 2004325632 | 11/2004 |
| KR | 1020060036131 | 4/2006 |
| KR | 1020060135772 | 12/2006 |

\* cited by examiner

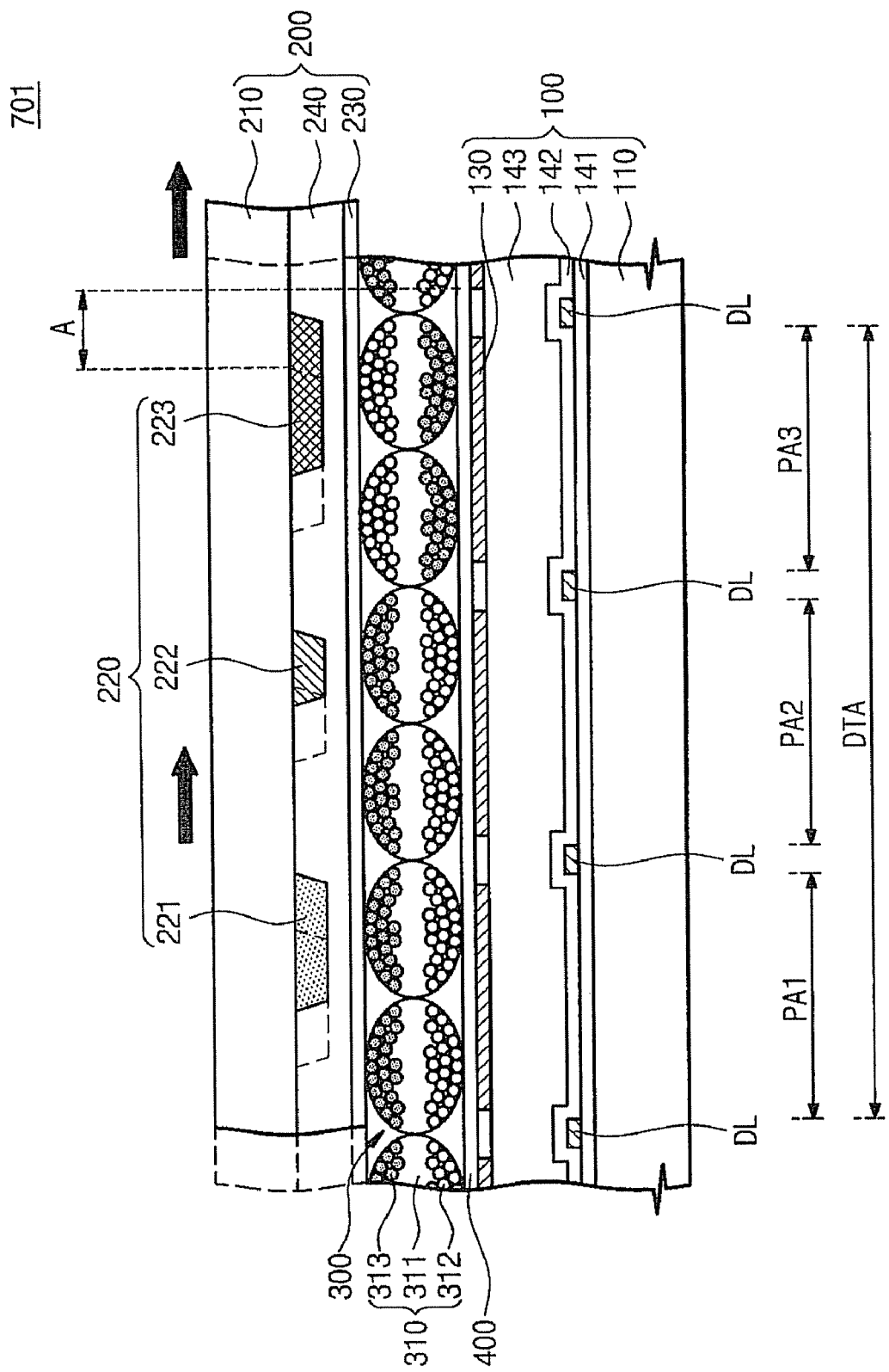

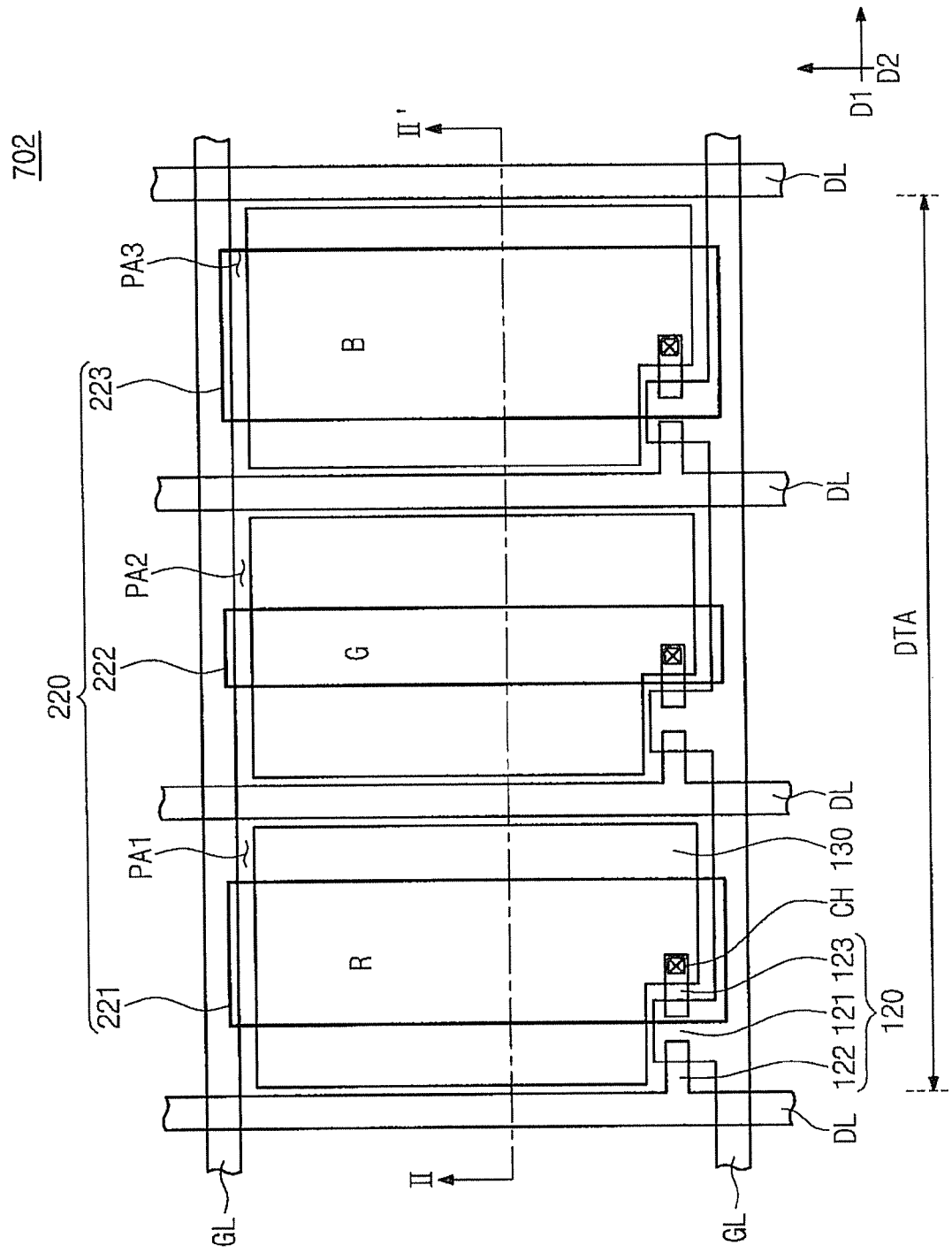

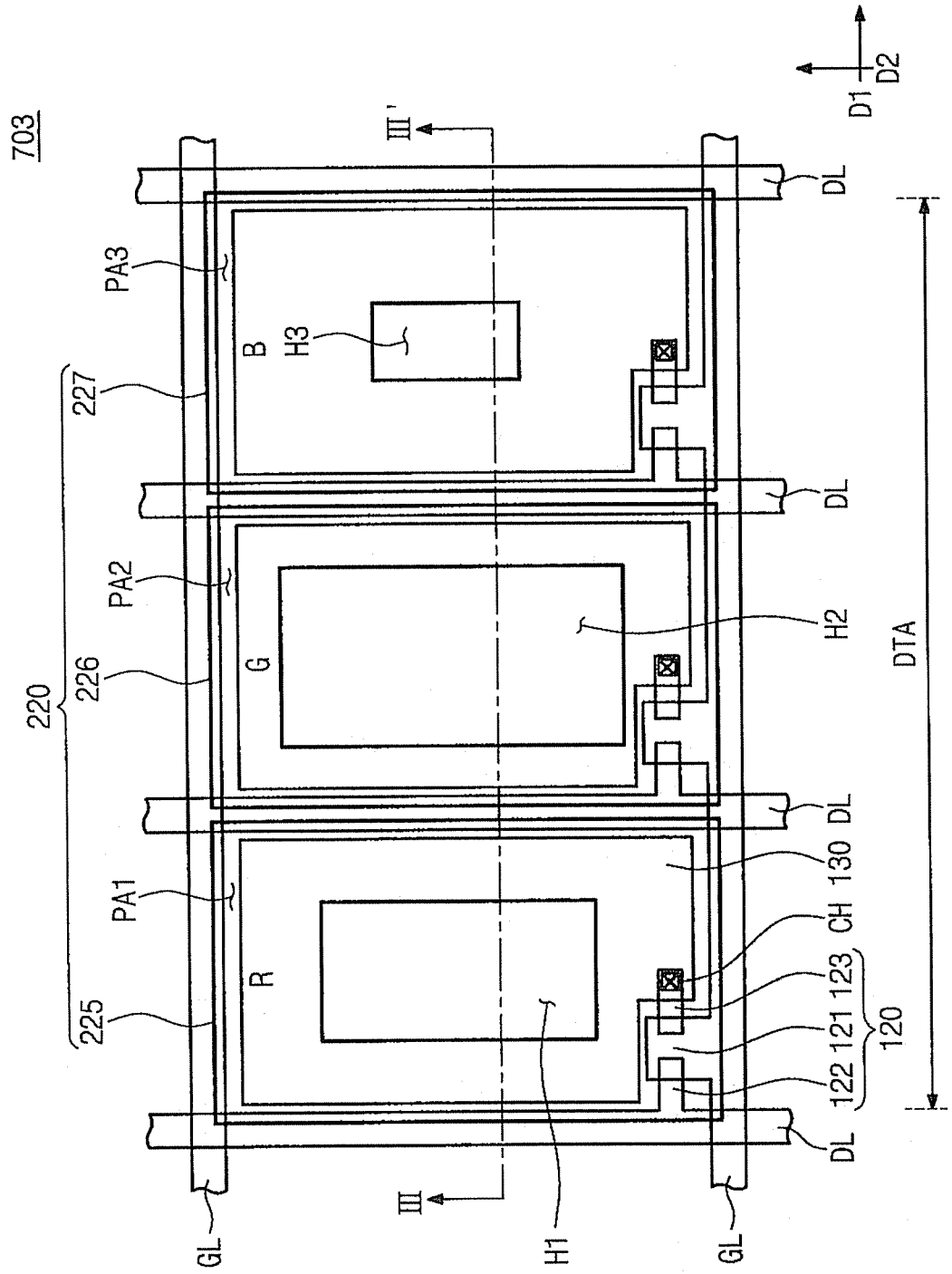

DISPLAY APPARATUS WITH COLOR PIXELS

This application claims priority to Korean Patent Application No. 2007-44108, filed on May 7, 2007 and No. 2007-60579 filed on Jun. 20, 2007, and all the benefits accruing therefrom under 35 U.S.C. §119, the contents of which in its entirety are herein incorporated by reference.

BACKGROUND OF THE INVENTION

1. Field of the Invention

The present invention relates to a display apparatus. More particularly, the present invention relates to a display apparatus capable of improving display characteristics and a method thereof.

2. Description of the Related Art

In general, a display apparatus is an apparatus which displays an image by receiving an image signal. Such a display apparatus is classified as either a cathode ray tube ("CRT") display, a liquid crystal display ("LCD"), an electrophoretic display ("EPD"), and the like.

The CRT display has a vacuum tube disposed therein, and an electron beam is irradiated from an electron gun to thereby display an image. Since the CRT display requires a sufficient amount of space to allow the electron beam to rotate, a thickness of the CRT display is large, and a weight of the CRT display is large.

The LCD is used to display an image using a characteristic in which an alignment direction of liquid crystals is altered due to an electric field. The EPD is used to display an image using a phenomenon that charged particles move due to an electric field, i.e., electrophoresis. The LCD and EPD are thinner and lighter than the CRT display. In particular, since the EPD is a reflective display that displays an image by using external light, an additional light source is not required. For this reason, the EPD is thinner and lighter than the LCD.

Each of the LCD and EPD includes an array substrate and a color filter substrate joined with the array substrate such that the array substrate and the color filter substrate face each other. The array substrate includes pixel electrodes arrayed in a matrix form and ("TFTs") that switch data voltages applied to the pixel electrodes. The color filter substrate includes color pixels respectively corresponding to the pixel electrodes and a common electrode which faces the pixel electrodes. An electric field is formed between the array substrate and the color filter substrate due to a potential difference between the pixel electrodes and the common electrode.

Meanwhile, in the LCD and EPD, an intensity of the electric field is low in low-voltage driving, and thus a contrast ratio is also low. In particular, charged particles in the EPD do not move freely due to an occurrence of collisions between the charged particles. Therefore, the EPD has a lower contrast ratio than the LCD. For example, when displaying a predetermined color of a corresponding color pixel, other colors which neighbor the predetermined color may be displayed. That is, when displaying the color of a red pixel, the colors of green and blue pixels may be displayed, and thus a purity of the red color is degraded.

Meanwhile, since the respective red, green and blue pixels have different luminances and visibilities, an amount of each of the red, green and blue pixels must be adjusted in order to keep a white balance. To this end, thicknesses of the red, green and blue pixels are formed to be different from one another. However, a process of forming the thicknesses of the red, green and blue pixels to be different from one another is not easy, and a planarization of a color filter substrate is degraded due to the different thicknesses of the red, green and blue pixels.

BRIEF SUMMARY OF THE INVENTION

Therefore, the present invention provides a display apparatus for improving display characteristics and a method thereof.

In one exemplary embodiment of the present invention, a display apparatus includes a first base substrate, pixel electrodes, a second base substrate, color pixels, a common electrode and an electrophoretic layer.

The pixel electrodes are disposed on the first base substrate in an array form, and the second base substrate faces the first base substrate. The color pixels are disposed on the second base substrate and corresponds to the pixel electrodes in a one-to-one correspondence. Each color pixel partially covers the corresponding pixel electrodes. The common electrode is disposed on the second base substrate to cover the color pixels. The electrophoretic layer includes a plurality of electrophoretic particles and the electrophoretic layer is interposed between the pixel electrodes and the common electrode.

The color pixels include at least one color pixel having different areas. Specifically, the color pixels include red, green and blue pixels which correspond to the pixel electrodes in a one-to-one correspondence. The green pixel has a smaller area than an area of each of the red and blue pixels. The red, green and blue pixels have different areas and have a same thickness.

First, second and third holes are respectively formed in the red, green and blue pixels, and sizes of the first to third holes are inversely proportional to the areas of the color pixels.

In another exemplary embodiment of the present invention, a display apparatus includes a first base substrate, pixel electrodes, a second base substrate, a plurality of color pixels and a common electrode. The pixel electrodes are disposed on the first base substrate. The second base substrate faces the first base substrate. The plurality of color pixels are disposed on the second base substrate to correspond to the pixel electrodes in a one-to-one correspondence and the plurality of color pixels extends in a same direction to partially cover the corresponding pixel electrodes. The common electrode is disposed on the second base substrate to cover the plurality of color pixels.

A region between two adjacent color pixels is opened so as to expose the second base substrate.

The plurality of color pixels include at least one color pixel having different areas. The color pixels include red, green and blue pixels which correspond to the pixel electrodes in a one-to-one correspondence. The red, green blue pixels have different sizes.

According to such a display apparatus, color pixels partially cover corresponding pixel electrodes, such that, when displaying the color of any one of the color pixels, a possibility that color pixels adjacent to the displayed color pixels will be expressed is substantially reduced. Accordingly, a degradation of a purity of an expressed color can be prevented or substantially reduced.

In another exemplary embodiment of the present invention, a method of manufacturing a display apparatus includes disposing pixel electrodes on a first base substrate, disposing a second base substrate to face the first base substrate, disposing color pixels on the second base substrate, disposing a common electrode on the second base substrate to cover the color pixels and disposing an electrophoretic layer including a plurality of electrophoretic particles between the pixel electrodes and the common electrode, wherein the color pixels correspond to the pixel electrodes in a one-to-one correspondence, each color pixel partially covers the corresponding pixel electrode.

Further, color pixels have different areas and have a same thickness. Thus, a difference in visibilities between respective color pixels can be thereby reduced, and a top surface of a second display substrate can be planarized. Accordingly, display characteristics of the display apparatus can be improved.

BRIEF DESCRIPTION OF THE DRAWINGS

The above and other aspects, features and advantages of the present invention will become readily apparent by describing in more detail exemplary embodiments thereof with reference to the accompanying drawings, in which:

FIG. 3B is a cross-sectional schematic diagram view illustrating a misalignment margin of the EPD illustrated in FIG. 1A;

FIG. 4A is a top plan schematic diagram view of an exemplary embodiment of a liquid crystal display ("LCD") according to another embodiment of the present invention;

FIG. 5A is a top plan schematic diagram view of another exemplary embodiment of an EPD according to the present invention;

DETAILED DESCRIPTION OF THE INVENTION

Figure 1A:
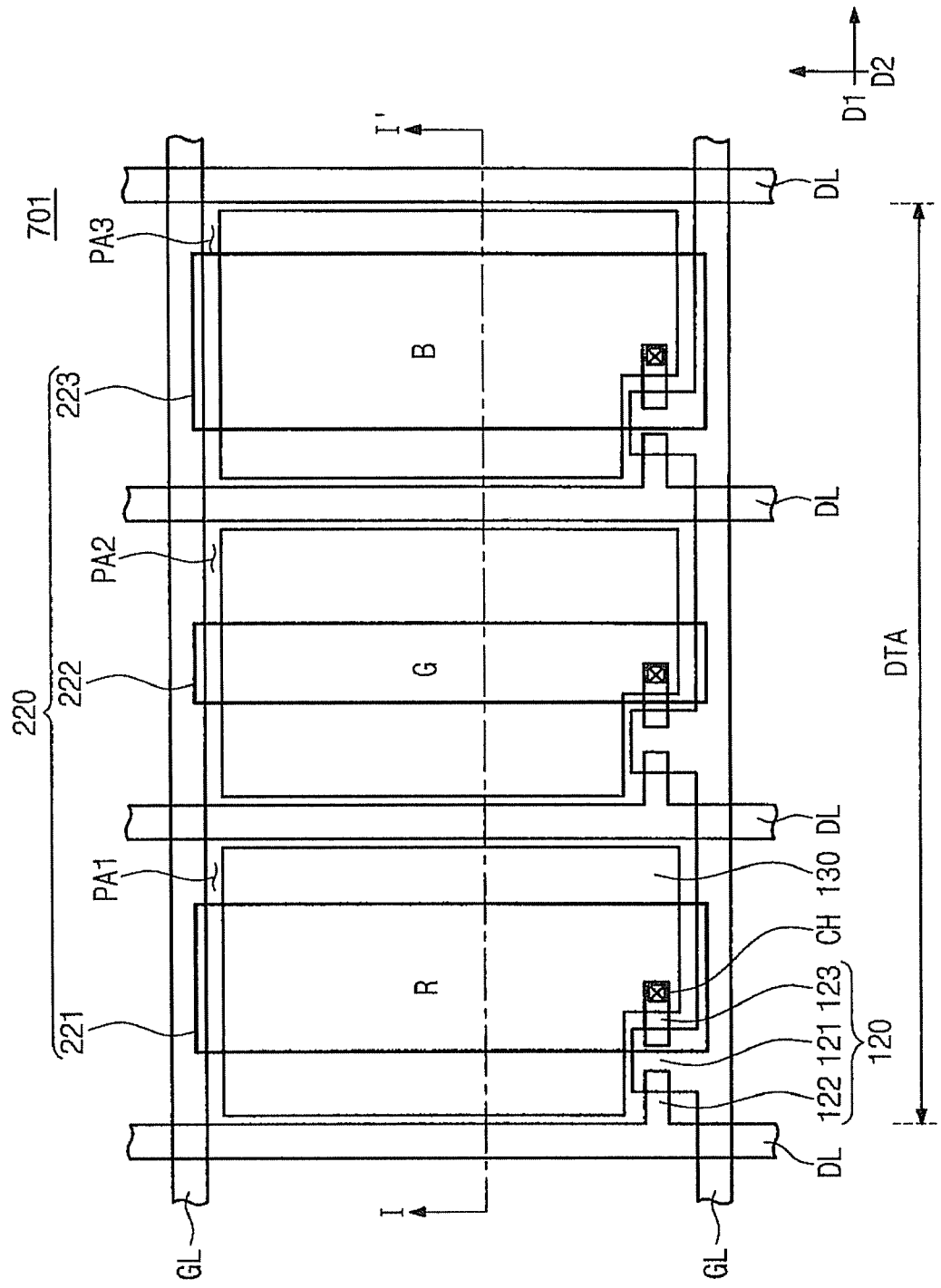
FIG. 1A is a top plan schematic diagram view of an exemplary embodiment of an electrophoretic display ("EPD") according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to accompanying drawings.

Figure 1B:
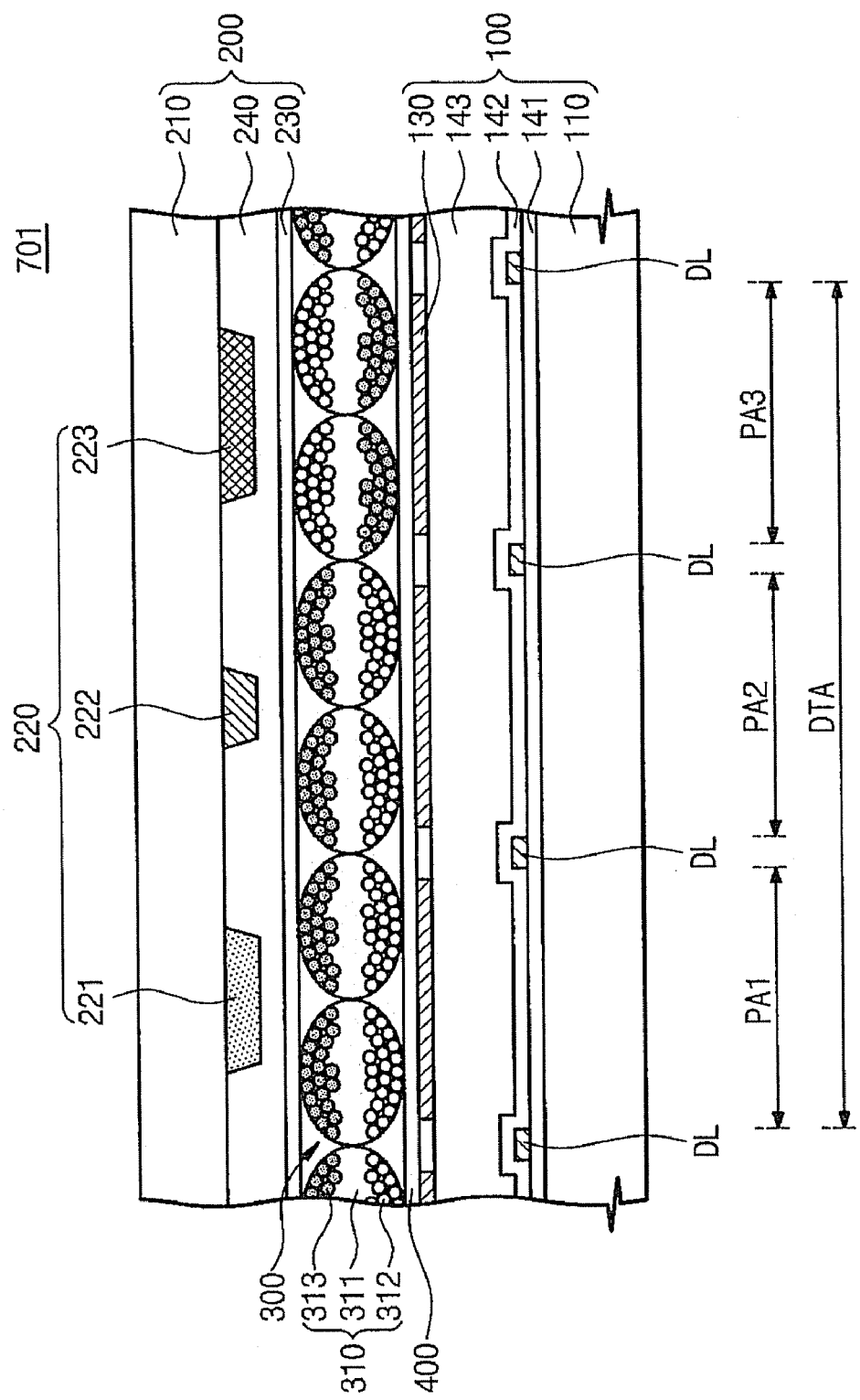
FIG. 1B is a cross-sectional schematic diagram view taken along line I-I' in FIG. 1A.

FIG. 1A is a top plan schematic diagram view of an exemplary embodiment of an electrophoretic display ("EPD") 701 according to the present invention, and FIG. 1B is a cross-sectional schematic diagram view taken along line I-I' in FIG. 1A.

Referring to FIGS. 1A and 1B, the exemplary embodiment of an EPD 701 according to the present invention includes a first display substrate 100, a second display substrate 200 which faces the first display substrate 100 and an electrophoretic layer 300 interposed between the first and second display substrates 100 and 200.

The first display substrate 100 includes a first base substrate 110, a plurality of gate lines GL, a plurality of data lines DL, thin film transistors ("TFTs") 120 and pixel electrodes 130.

The first base substrate 110 includes a plurality of pixel areas PA defined in an array form. However, only first to third pixel areas PA1 to PA3 of the plurality of pixel areas PA are illustrated in the current exemplary embodiment of the present invention. The first to third pixel areas PA1 to PA3 are sequentially arranged in a first direction D1 to constitute one dot area DTA.

Still referring to FIGS. 1A and 1B, the plurality of gate lines GL is disposed on a top surface of the base substrate 110 and extends in the first direction D1. The plurality of data lines DL extends in a second direction D2. In exemplary embodiments, the second direction D2 is substantially perpendicular to the first direction D1. The plurality of data lines DL and the plurality of gate lines GL cross each other while being insulated from each other. In exemplary embodiments, the plurality of data lines DL and the plurality of gate lines GL define the first to third pixel areas PA1 to PA3. The plurality of gate lines GL receives gate signals and then applies the gate signals to the respective TFTs 120. The plurality of data lines DL receives data signals and then applies the data signals to the respective TFTs 120.

The TFTs 120 and the pixel electrodes 130 are disposed in the respective first to third pixel areas PA1 to PA3. Each of the TFTs 120 includes a gate electrode 121 which branches from a corresponding gate line GL of the plurality of gate lines GL, an active layer (not shown) and an ohmic contact layer (not shown), which are sequentially disposed on the gate electrode, a source electrode 122 which branches from a corresponding data line DL of the plurality of the data lines DL and a drain electrode 123 disposed on the ohmic contact layer. Each of the pixel electrodes 130 is electrically connected to the drain electrode 123. Each of the TFTs 120 receives a gate-on signal input from the corresponding gate line GL and is thereby turned on. The turned-on TFT 120 receives a data signal input from the corresponding data line DL and then applies the data signal to the corresponding pixel electrode 130.

The first display substrate 100 further includes a gate insulating layer 141, a protective layer 142 and an organic insulating layer 143. The gate insulating layer 141 is disposed on the first base substrate 110 to cover the gate lines GL and the gate electrode 121. The protective layer 142 and the organic insulating layer 143 are disposed on the gate insulating layer 141 to cover the data lines DL and the TFTs 120. In exemplary embodiments, the organic insulating layer 143 includes a photosensitive acryl resin. The organic insulating layer 143 allows the data lines DL to be spaced apart from the pixel electrodes 130, and the organic insulating layer 143 allows a top surface of the first display substrate 100 to be planarized.

Further, a contact hole CH which exposes the drain electrode 123 is formed in the protective layer 142 and the organic insulating layer 143. The pixel electrodes 130 are disposed on a top surface of the organic insulating layer 143 to be electrically connected to the drain electrode 123 through the contact hole CH.

The second display substrate 200 is aligned with respect to the first display substrate 100. The second display substrate 200 includes a second base substrate 210 which faces the first base substrate 110 and a color filter layer 220 and a common electrode 230, which are disposed on the second base substrate 210. In an exemplary embodiment, the second base substrate 210 includes a flexible material such as polyethyleneterephthalate ("PET"). The common electrode 230 faces the pixel electrodes 130 and the common electrode 230 receives a common voltage. An electric field is formed between the common electrode 230 and the pixel electrodes 130 due to a potential difference between the common voltage and the data voltage. In exemplary embodiments of the present invention, each of the pixel electrodes 130 and the common electrode 230 includes a transparent conductive material such as indium zinc oxide ("IZO") or indium tin oxide ("ITO").

An electrophoretic layer 300 including a plurality of electrophoretic particles is interposed between the pixel electrodes 130 of the first display substrate 100 and the common electrode 230 of the second display substrate 200. In exemplary embodiments, the plurality of electrophoretic particles includes white and black particles 312 and 313, respectively. The white and black particles 312 and 313 are charged with electric charges having different polarities from each other. The black and white particles 313 and 312 display a gray level of a corresponding pixel area PA while moving in accordance with a magnitude and direction of an electric field formed between the pixel electrodes 130 and the common electrode 230. Movements of the plurality of electrophoretic particles will be described in more detail with reference to FIGS. 2A through 2C.

Meanwhile, the EPD 701 further includes an adhesive member 400 to bond the electrophoretic layer 300 to the first display substrate 100. The adhesive member 400 is interposed between the electrophoretic layer 300 and the first display substrate 100 to adhere the electrophoretic layer 300 to the first display substrate 100. In an exemplary embodiment, the electrophoretic layer 300 may be incorporated with the second display substrate 200 into a single film.

The color filter layer 220 is disposed on the second base substrate 210. The color filter layer 220 includes color pixels which correspond to the pixel electrodes 130 in a one-to-one correspondence and the color pixels partially cover the corresponding pixel electrodes 130. As shown in FIG. 1B, the color pixels include openings which are adjacent to the respective color pixels in order to expose the second base substrate 210 therethrough. As shown in FIGS. 1A and 1B, both the color pixels and the openings adjacent to the color pixels are arranged so as to extend in the second direction D2. The color pixels include at least red, green and blue pixels 221, 222 and 223 which display colors using light reflected from the white and black particles 312 and 313. The red, green and blue pixels 221, 222 and 223 are disposed on the second base substrate 210 to correspond to the first to third pixel areas PA1 to PA3 in a one-to-one correspondence. In exemplary embodiments, the red, green and blue pixels 221, 222 and 223 are formed using photoresists respectively containing red, green and blue pigments.

In an exemplary embodiment, the red pixel 221 is disposed in the first pixel area PA1, the green pixel 222 is disposed in the second pixel area PA2 and the blue pixel 223 is disposed in the third pixel area PA3. Accordingly, red, green and blue are displayed in the first to third pixel areas PA1 to PA3 in accordance with gray level values of the first to third pixel areas PA1 to PA3, respectively. In exemplary embodiments, either a white or black color is displayed in an area where the red, green and blue pixels 221, 222 and 223 are not disposed. The white or the black color is displayed in the area where the red, green and blue pixels 221, 222 and 223 are not disposed in accordance with each of the gray level values of the first to third pixel areas PA1 to PA3.

Meanwhile, red, green and blue colors respectively displayed from the red, green and blue pixels 221, 222 and 223 are mixed in order to maintain a white balance in the dot area DTA. However, since the red, green and blue pixels include different luminances and visibilities, an amount of each of the red, green and blue pigments is adjusted in order to maintain the white balance.

In the current exemplary embodiment of the present invention, the red, green and blue pixels 221, 222 and 223 include a same thickness and include different areas, to thereby adjust amounts of the red, green and blue pigments. In general, the luminance and visibility of the blue pixel 223 is the poorest of the red, green and blue pixels 221, 222 and 223, and the luminance and visibility of the red pixel 221 is better than that of the blue pixel 223. On the other hand, the luminance and visibility of the green pixel 222 is better than the red and blue pixels 221 and 223.

In exemplary embodiments, an area of the green pixel 223 is formed to be smaller than areas of the red and blue pixels 221 and 223. The areas of the red, green and blue pixels 221, 222 and 223 are increased in order from the green pixel 222 the red pixel 221 and then the blue pixel 223. In an exemplary embodiment, the red, green and blue pixels 221, 222 and 223 include an area ratio of 7:4:9. Accordingly, differences in visibilities and luminances generated between the red, green and blue pixels 221, 222 and 223 can be thereby reduced.

Since the white balance is maintained by differentiating the areas of the red, green and blue pixels 221, 222 and 223, the red, green and blue pixels 221, 222 and 223 can be formed to include a same or substantially similar thickness. Thus, a top surface of the second display substrate 200 can be planarized. Further, the areas of the red, green and blue pixels 221, 222 and 223 is adjusted more easily than when reducing the differences in visibilities and luminances generated between the red, green and blue pixels 221, 222 and 223 by adjusting the thicknesses of the red, green and blue pixels 221, 222 and 223.

In the current exemplary embodiment, the red, green and blue pixels 221, 222 and 223 extend in the second direction D2 while corresponding to the pixel electrodes 130. In exemplary embodiments, the red, green and blue pixels 221, 222 and 223 intersect centers or central portions of the corresponding pixel electrodes 130, and the red, green and blue pixels 221, 222 and 223 are spaced apart from one another at a predetermined distance. In exemplary embodiments, spacing distances between adjacent color pixels of the red, green and blue pixels 221, 222 and 223 are different from each other.

Meanwhile, the second display substrate 200 further includes an overcoat layer 240. The overcoat layer 240 covers the color pixels in order to reduce a step difference between an area formed with the color pixels and an area which is not formed with the color pixels. The overcoat layer 240 is disposed on an entire surface of the second base substrate 210, and the common electrode 230 is disposed on the overcoat layer 240 to include a uniform thickness.

Figure 2A:
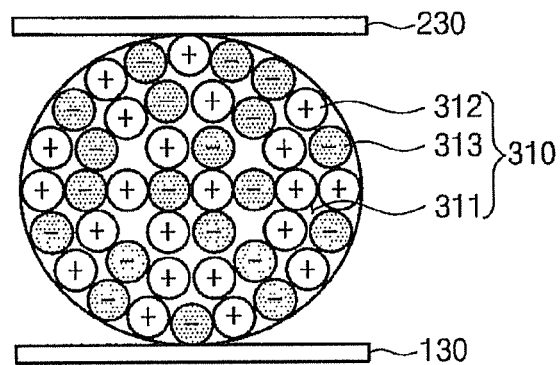
FIGS. 2A through 2C are cross-sectional schematic diagram views illustrating directional properties of electrophoretic particles.
Figure 2B:
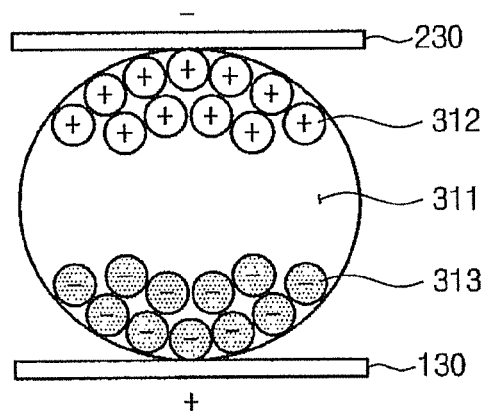
Figure 2C:
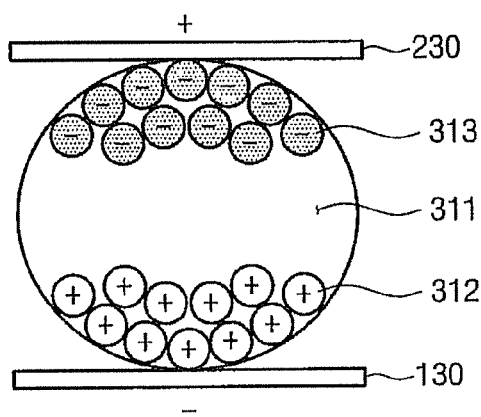

FIGS. 2A through 2C are cross-sectional schematic diagram views illustrating directional properties of electrophoretic particles.

Referring to FIG. 2A, an electrophoretic layer 300 is interposed between a pixel electrode 130 and a common electrode 230. In the current exemplary embodiment of the present invention, the electrophoretic layer 300 includes a plurality of micro capsules 310 including a spherical shape. However, the present invention is not limited thereto. Each of the micro capsules 310 includes a dispersion medium 311 including an insulative liquid and a plurality of electrophoretic particles 312 and 313 dispersed within the dispersion medium 311. The plurality of electrophoretic particles include white and black particles 312 and 313. The white and black particles 312 and 313 are charged with electric charges including different polarities.

A surfactant is added to the dispersion medium 311. In order to prevent deposition due to gravity, specific gravities of the dispersion medium 311 and the white and black particles 312 and 313 are substantially similar. The dispersion medium 311 prevents the white and black particles 312 and 313 from gathering together or agglomerating so as to form a large mass.

In an exemplary embodiment, the white particles 312 are charged with a positive (+) electric charge and include a material such as titanium dioxide ("$TiO_2$"), so as to be white. The black particles 313 are charged with a negative (−) electric charge and include carbon powder such as carbon black, so as to be black.

As illustrated in FIG. 2A, since the white and black particles 312 and 313 do not have directional properties in a state in which an electric field is not formed between the pixel electrode 130 and the common electrode 230, the white and black particles 312 and 313 are randomly positioned between the pixel electrode 130 and the common electrode 230.

As illustrated in FIG. 2B, when a data voltage having a positive polarity (+) with respect to a common voltage is applied to the pixel electrode 130, an electric field is formed between the pixel electrode 130 and the common electrode 230 due to a potential difference between the data voltage and the common voltage.

The white particles 312, charged with the positive (+) electric charge, move toward the common electrode 230, and the black particles 313, charged with the negative (−) electric charge, move toward the pixel electrode 130. As a result, a white gray level is displayed in a corresponding pixel area.

As described above, when displaying the white gray level, light incident through the common electrode 230 is reflected by the white particles 312 and the reflected light is emitted through the common electrode 230 again. Accordingly, a white gray-level image can be viewed by a user. When a color pixel is disposed on the common electrode 230 through which the reflected light is emitted, the color of the color pixel is displayed and therefore can be viewed by a user.

As illustrated in FIG. 2C, when a data voltage having a negative polarity (−) is applied to the pixel electrode 130 with respect to a common voltage, an electric field is formed between the pixel electrode 130 and the common electrode 230.

The white particles 312, charged with the positive (+) electric charge, move toward the pixel electrode 130, and the black particles 313, charged with the negative (−) electric charge, move toward the common electrode 230. When an electric field having a negative polarity (−) is formed between the pixel electrode 130 and the common electrode 230, a black gray level is displayed in a corresponding pixel area.

As described above, when displaying the black gray level, light incident through the common electrode 230 is absorbed by the black particles 313, and thus the light is scarcely emitted through the common electrode 230. Accordingly, the color of the color pixel disposed on the common electrode 230 is not displayed, and therefore a black gray-level image can be viewed by a user.

Referring back to FIG. 1B, when the color of any one of the red, green and blue pixels 221, 222 and 223 is displayed, an electric field having a positive polarity (+) is formed between the common electrode 230 and the pixel electrode 130 corresponding to the displayed color pixel, and an electric field having a negative polarity (−) is formed between the common electrode 230 and the pixel electrodes 130 corresponding to the other color pixels. An exemplary embodiment of displaying the color of the blue pixel 223 which is disposed in the third pixel area PA3 will now be described in more detail below.

An electric field having a negative polarity (−) is formed in the first and second pixel areas PA1 and PA2, and an electric field having a positive polarity (+) is formed in the third pixel area PA3. Therefore, the black particles 313 move toward the common electrode 230 in the first and second pixel areas PA1 and PA2, and the white particles 312 move toward the pixel electrode 130 in the third pixel area PA3. Accordingly, the color of the blue pixel 223 is displayed, and the colors of the red and green pixels 221 and 222 are not displayed. As a result, a blue color can be viewed in the dot area DTA by a user.

However, when the white and black particles 312 and 313 move, collisions between the white and black particles 312 and 313 occur, and thus some of the white particles 312 may move toward the common electrode 230 in the first and second pixel areas PA1 and PA2. Therefore, the colors of the red and green pixels 221 and 222 are displayed in the first and second pixel areas PA1 and PA2 which become mixed with the blue color. As a result, a purity of the blue which is viewed in the dot area DTA is thereby degraded.

In order to prevent the purity of the blue color from being degraded as described above, in the EPD 701 according to an exemplary embodiment of the present invention, the red, green and blue pixels 221, 222 and 223 are disposed to partially cover the corresponding pixel electrodes 130. Thus, the areas of the red, green and blue pixels 221, 222 and 223 disposed in the first to third pixel areas PA1 to PA3 are reduced. As a result, a degradation of the purity of the blue color can be prevented or substantially reduced when the red, green and blue pixels 221, 222 and 223 are disposed to overlap with the corresponding pixel electrodes 130. That is, since the areas of the red and green pixels 221 and 222 are reduced, an amount of light reflected by the white particles 312 and transmitted through the red and green pixels 221 and 222 is thereby reduced in the first and second pixel areas PA1 and PA2. Accordingly, when expressing the color of any one of the color pixels is displayed, a degradation of a purity of the displayed color can be prevented or substantially reduced.

Figure 3A:
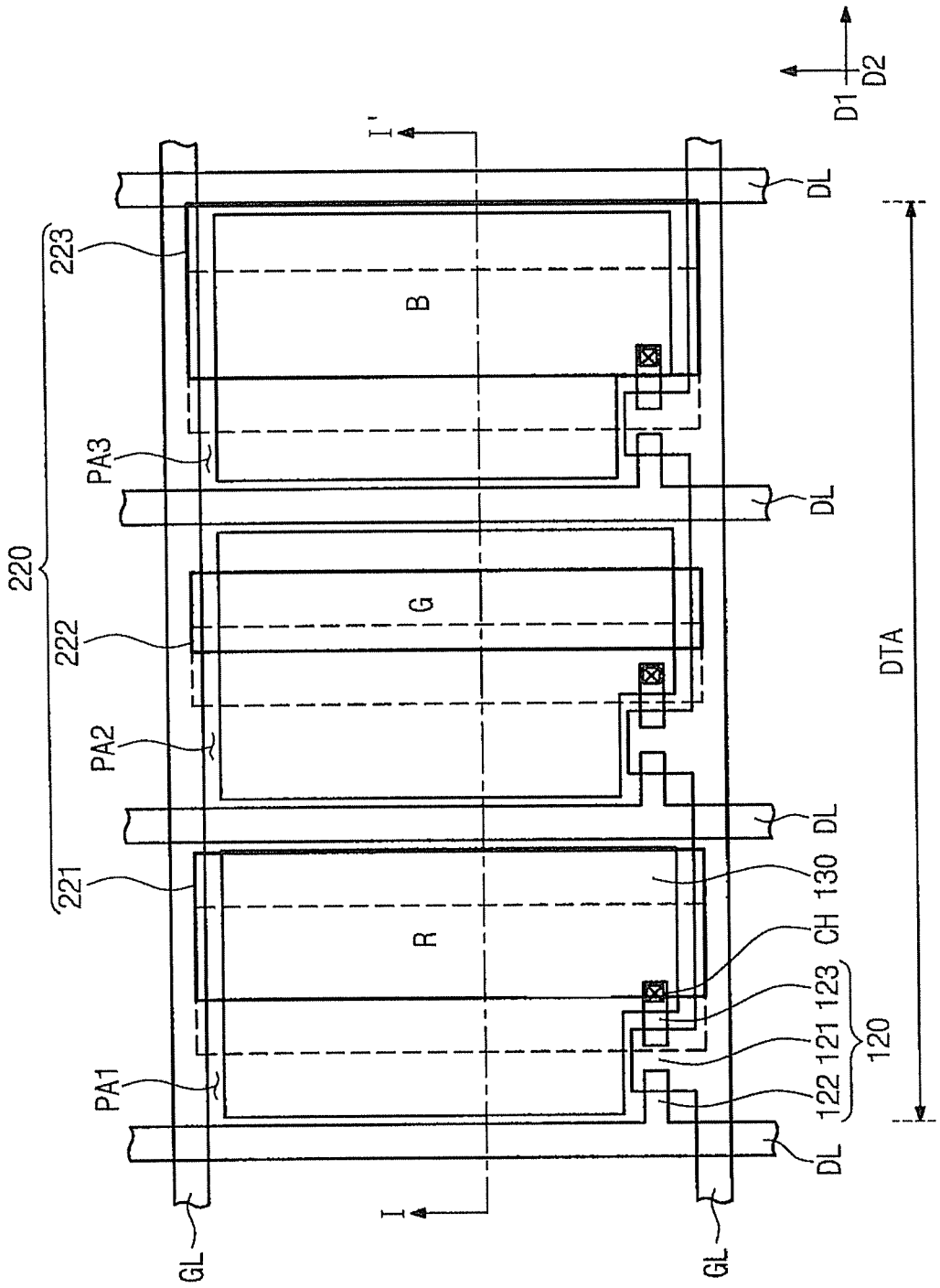
FIG. 3A is a top plan schematic diagram view illustrating a misalignment margin of the EPD illustrated in FIG. 1A.

FIG. 3A is a top plan schematic diagram view illustrating a misalignment margin of the EPD 701 illustrated in FIG. 1A. FIG. 3B is a cross-sectional schematic diagram view illustrating a misalignment margin of the EPD 701 illustrated in FIG. 1A.

Referring to FIGS. 3A and 3B, a misalignment may occur when the first and second display substrates 100 and 200 are joined together, e.g., if the second display substrate 200 is joined with the first display substrate 100 by moving the second display substrate 200 in the first direction D1 by a predetermined distance with respect to the first display substrate 100. An image is normally displayed only when the color pixels are aligned with the corresponding pixel electrodes 130 in the EPD 701. Thus, when the misalignment between the first and second display substrates 100 and 200 causes an alignment error between the color pixels and the pixel electrodes 130, an erroneous image is displayed in the EPD 701.

In the current exemplary embodiment, the red, green and blue pixels 221, 222 and 223 are arranged substantially in parallel with one another in a same direction to partially cover the corresponding pixel electrodes 130. Further, the red, green and blue pixels 221, 222 and 223 intersect centers or central portions of the corresponding pixel electrodes 130, and the red, green and blue pixels 221, 222 and 223 are spaced apart from one another. Therefore, a misalignment margin is increased as compared to when the red, green and blue pixels 221, 222 and 223 are disposed to completely overlap with the corresponding pixel electrodes 130. As a result, failure due to the misalignment between the first and second display substrates 100 and 200 is prevented or substantially reduced. In the current exemplary embodiment, the misalignment margin corresponds to a spacing distance 'A' between the blue pixel 223 and a pixel electrode 130 adjacent to the blue pixel 223.

Figure 4B:
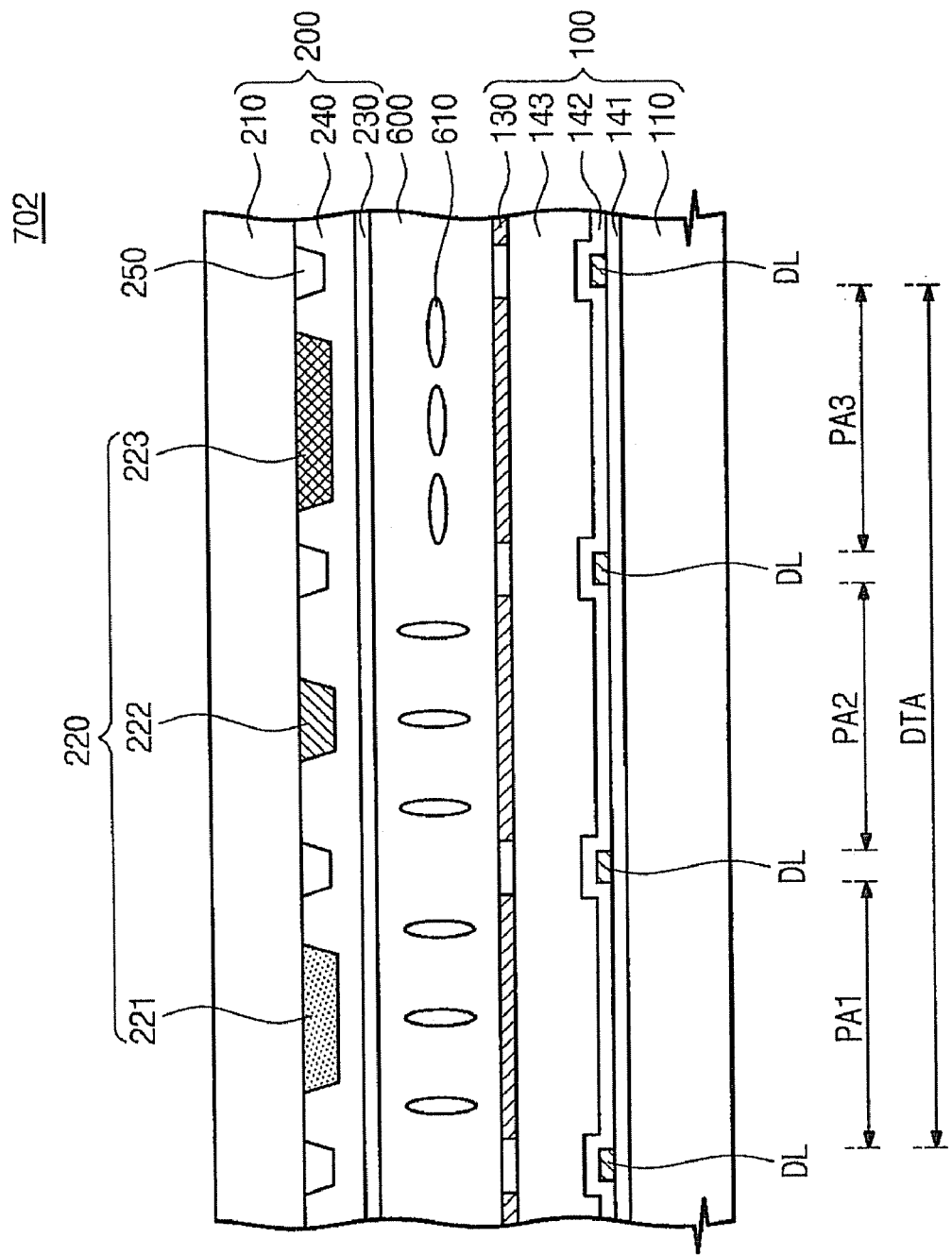
FIG. 4B is a cross-sectional schematic diagram view taken along line II-II' in FIG. 4A.

FIG. 4A is a top plan schematic diagram view of a liquid crystal display ("LCD") 702 according to another embodiment of the present invention, and FIG. 4B is a cross-sectional schematic diagram view taken along line II-II' in FIG. 4A. However, the same elements illustrated in FIGS. 4A and 4B as those illustrated in FIGS. 1A and 1B are designated with the same reference numerals, and thus detailed descriptions of the same elements will be omitted.

Referring to FIGS. 4A and 4B, the LCD 702 according to the current exemplary embodiment includes a first display substrate 100, a second display substrate 200 which faces the first display substrate 100 and a liquid crystal layer 600 interposed between the first and second display substrates 100 and 200. The LCD 702 includes a structure similar to the EPD 701 illustrated in FIGS. 1A and 1B except for the liquid crystal layer 600. Therefore, detailed descriptions of the first and second display substrates 100 and 200 will be omitted, and only elements of the LCD 702 which are different from those of the EPD 701 will be described.

The first display substrate 100 includes a first base substrate 110, a plurality of gate lines GL, a plurality of data lines DL, TFTs 120, pixel electrodes 130, a gate insulating layer 141, a protective layer 142 and an organic insulating layer 143.

The second display substrate 200 includes a second base substrate 210, a color filter layer 220, a common electrode 230 and an overcoat layer 240. The second display substrate 200 is joined with the first display substrate 100 to face the first display substrate 100. The second display substrate 200 further includes black matrixes 250. The black matrixes 250 are disposed on the second base substrate 210 and correspond to the gate lines GL, the data lines DL and the TFTs 120. The black matrixes 250 include a light shielding material, and thus can prevent or substantially reduce light from being leaked at peripheral portions of the respective first to third pixel areas PA1 to PA3.

The LCD 702 further includes a backlight unit (not shown) which is disposed at a rear surface of the first display substrate 100, and the backlight provides light to the first display substrate 100.

In exemplary embodiments, the liquid crystal layer 600 is interposed between the first and second display substrates 100 and 200 using a drop-filling method or a vacuum injection method. Liquid crystal molecules 610 constituting the liquid crystal layer 600 include an alignment direction depending on a potential difference between the common electrode 230 and the pixel electrodes 130, and transmittance of the light is varied depending on the alignment direction. The color pixels display respective colors using the light emitted from the backlight.

In the current exemplary embodiment, an example of expressing the blue pixel 223 is illustrated in FIGS. 1A and 1B. In an exemplary embodiment, the LCD 702 is a normally white twist nematic ("TN") mode, and the liquid crystal layer 600 includes liquid crystal molecules 610 including a positive dielectric anisotropy. Each of the liquid crystal molecules 610 includes an elliptic section in which lengths of major and minor axes are different from each other. Hereinafter, the alignment direction of the liquid crystal molecules 610 will be described with respect to the direction of the major axis.

Meanwhile, the LCD 702 further includes first and second polarizers (not shown) respectively adhered to outer surfaces of the first and second display substrates 100 and 200. The first and second polarizers are positioned to include absorption axes substantially perpendicular to each other.

In a state in which the LCD 702 is turned off, the liquid crystal molecules 610 are initially aligned substantially in parallel with the first and second display substrates 100 and 200. After light incident onto the first polarizer is polarized in one direction in this state, a phase of the light is changed while passing through the liquid crystal molecules 610, and the light then passes through the second polarizer. Thus, the LCD 702 is in a white state.

When an electric field is applied between the pixel electrodes 130 and the common electrode 230, the electric field is formed in a direction substantially perpendicular to the first and second display substrate 100 and 200. The liquid crystal molecules 610 are arranged in a direction substantially parallel with the electric field. Thus, the liquid crystal molecules 610 are arranged in a direction substantially perpendicular to the first and second substrates 100 and 200. In this state, the light incident onto the first polarizer is polarized in one direction and then absorbed in the second polarizer. The LCD 702 is in a black state which is darker than the white state.

In order to allow a blue color to be viewed in the dot area DTA, a data voltage is applied to the pixel electrodes 130 corresponding to the red and green pixels 221 and 222 such that the liquid crystal molecules 610 are arranged in a direction substantially perpendicular to the first and second display substrates 100 and 200 in the first and second pixel areas PA1 and PA2. An off state is maintained in the third pixel area PA3 corresponding to the blue pixel 223 such that the liquid crystal molecules 610 are arranged in the direction substantially parallel with the electric field.

Meanwhile, when the LCD 702 is driven at a low voltage so as to reduce a power consumption of the LCD 702, the liquid crystal molecules 610 are not arranged in a direction substantially perpendicular to the first and second display substrates 100 and 200, but instead are arranged to be inclined with respect to the first and second substrates 100 and 200. When the liquid crystal molecules 610 positioned at the first and the second pixel areas PA1 and PA2 are arranged to be inclined with respect to the first and second display substrates 100 and 200, the colors of the red and green pixels 221 and 222 are displayed and are therefore mixed with the blue color. As a result, a purity of the blue color is degraded in the dot area DTA.

However, since the color pixels partially cover the corresponding pixel electrodes, a possibility that the light will be emitted through the red and green pixels 221 and 222 is thereby reduced. Thus, the possibility that the colors of the red and green pixels 221 and 222 will be displayed is reduced. As a result, a degradation of the purity of the blue color expressed from the blue pixel 223 can be prevented or substantially reduced.

Figure 5B:
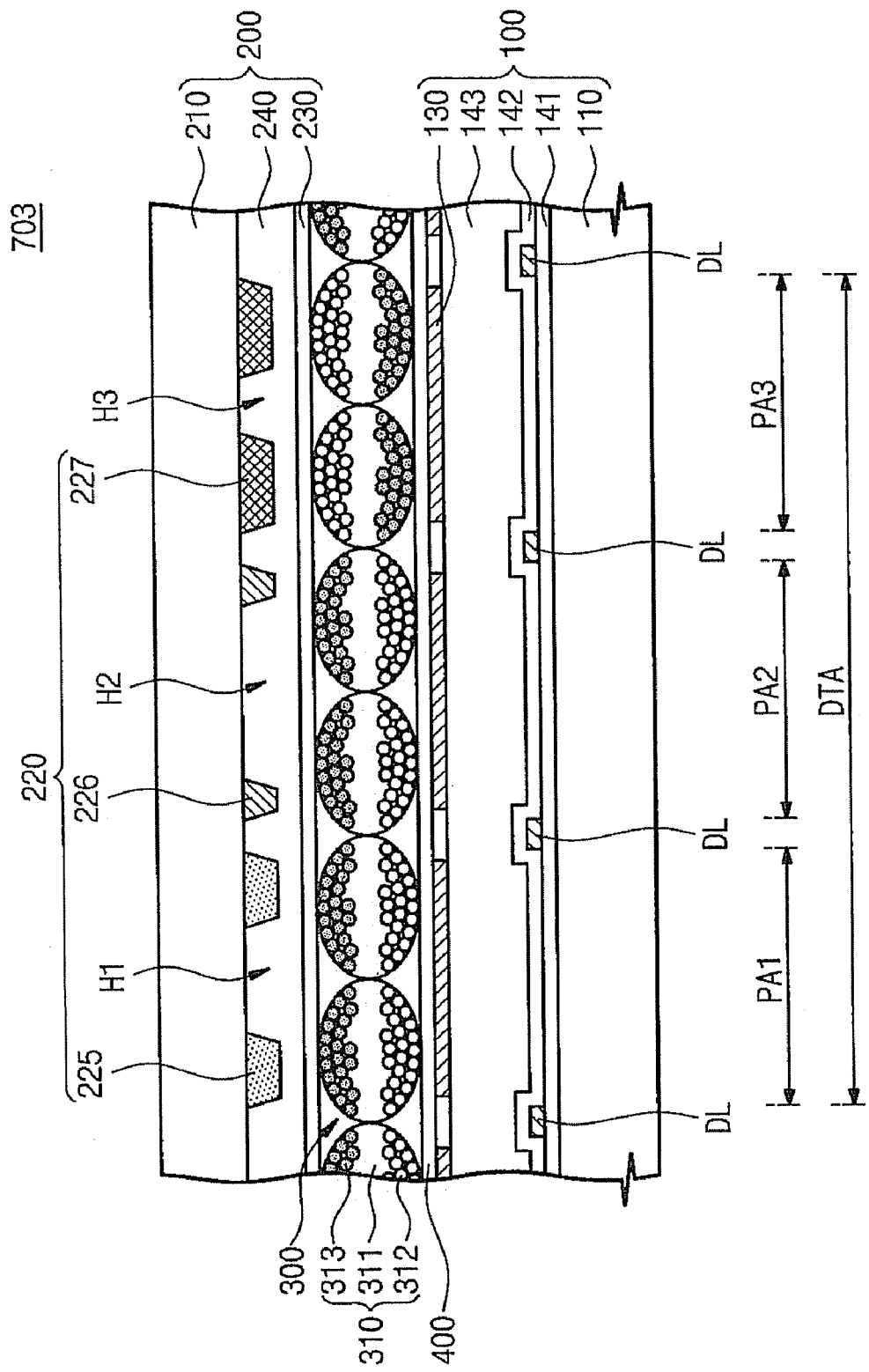
FIG. 5B is a cross-sectional schematic diagram view taken along line III-III' in FIG. 5A.

FIG. 5A is a top plan schematic diagram view of an EPD 703 according to still another embodiment of the present invention, and FIG. 5B is a cross-sectional schematic diagram view taken along line III-III' in FIG. 5A. However, the same elements illustrated in FIGS. 5A and 5B as those illustrated in FIGS. 1A and 1B are designated with the same reference numerals, and thus detailed descriptions of the same elements will be omitted.

Referring now to FIGS. 5A and 5B, the EPD 703 according to the current exemplary embodiment includes a first display substrate 100, a second display substrate 200 which faces the first display substrate 100 and an electrophoretic layer 300 interposed between the first and second display substrates 100 and 200.

The first display substrate 100 includes a first base substrate 110, a plurality of gate lines GL, a plurality of data lines DL, TFTs 120, pixel electrodes 130, a gate insulating layer 141, a protective layer 142 and an organic insulating layer 143. The second display substrate 200 includes a second base substrate 210, a color filter layer 220, a common electrode 230 and an overcoat layer 240.

In the current exemplary embodiment, red, green and blue pixels 225, 226 and 227 cover corresponding pixel electrodes 130, and extend to an area disposed with the gate and data lines GL and DL so as to overlap with the gate and data lines GL and DL. First to third holes H1 to H3 are respectively formed in the red, green and blue pixels 225, 226 and 227. Thus, the red, green and blue pixels 225, 226 and 227 partially cover the corresponding pixel electrodes 130, and the areas of the red, green and blue pixels 225, 226 and 227 are reduced by the sizes of the first to third holes H1 to H3. As a result, when the color of the blue pixel 227 is displayed in a dot area DTA, the colors of the red and green pixels 225 and 226 can be prevented or substantially reduced from being displayed. Further, since white and black are displayed in the first to third holes H1 to H3, a degradation of a purity of the blue color can be prevented or substantially reduced.

In an exemplary embodiment, the first to third holes H1 to H3 are respectively formed at central portions of the red, green and blue pixels 225, 226 and 227. In exemplary embodiments, the first to third holes H1 to H3 are formed in a rectangular shape. However, the present invention is not limited thereto.

Meanwhile, sizes of the first to third holes H1 to H3 are different from one another. The first hole H1 is formed in the red pixel 225, and the second hole H2, which is formed larger than the first hole H1, is formed in the green pixel 226. Thus, the green pixel 226 includes a smaller area than an area of the red pixel 225. The third hole H3, which is formed smaller than the first hole H1, is formed in the blue pixel 227. Thus, the blue pixel 227 includes a larger area than areas of the red and green pixels 225 and 226.

In an exemplary embodiment, the sizes of the first to third holes H1 to H3 include a ratio of 3:6:1. Assuming that a total area of an area formed with the first hole H1 and an area of the red pixel 225 is "100", the first hole H1 occupies about 30% of the total area. Assuming that a total area of an area formed with the second hole H2 and an area of the green pixel 226 is "100", the second hole H2 occupies about 60% of the total area. Assuming that a total area of an area formed with the third hole H3 and an area of the blue pixel 227 is "100", the third hole H3 occupies about 10% of the total area.

The sizes of the first to third holes H1 to H3 are reduced in an order from the second hole H2 the first hole H1 and then the third hole H3, such that the areas of the red, green and blue pixels 225, 226 and 227 are increased in an order from the green pixel 226, the red pixel 225 and then the blue pixel 227. Thus, differences of visibilities and luminances between the red, green and blue pixels 225, 226 and 227 can be thereby reduced. Accordingly, a white balance can be maintained in the dot area DTA.

Meanwhile, since the red, green and blue pixels 225, 226 and 227 include a same thickness, a top surface of the second display substrate 200 can be planarized. Further, the differences of visibilities and luminances between respective color pixels can be more easily reduced by adjusting the areas of the red, green and blue pixels 225, 226 and 227 than by adjusting the thicknesses of the red, green and blue pixels 225, 226 and 227.

Although an example of forming the first to third holes H1 to H3 in a rectangular shape is described in the current exemplary embodiment, the first to third holes H1 to H3 may be formed in other shapes except for the rectangular shape. Further, in exemplary embodiments, the color pixels in which the first to third holes H1 to H3 are formed can be applied to the LCD.

Figure 6A:
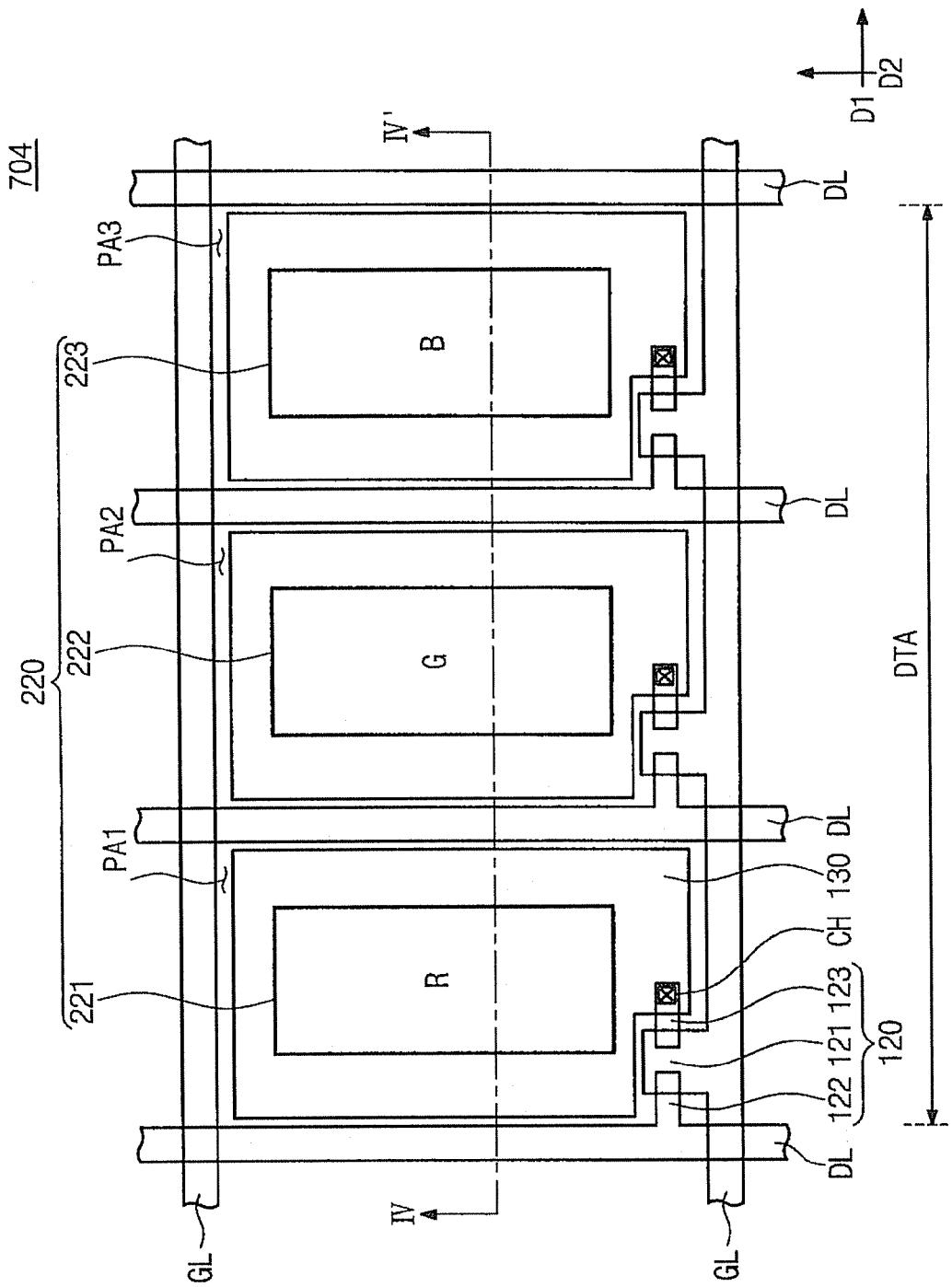
FIG. 6A is a top plan schematic diagram view of another exemplary embodiment of an EPD according to the present invention.
Figure 6B:
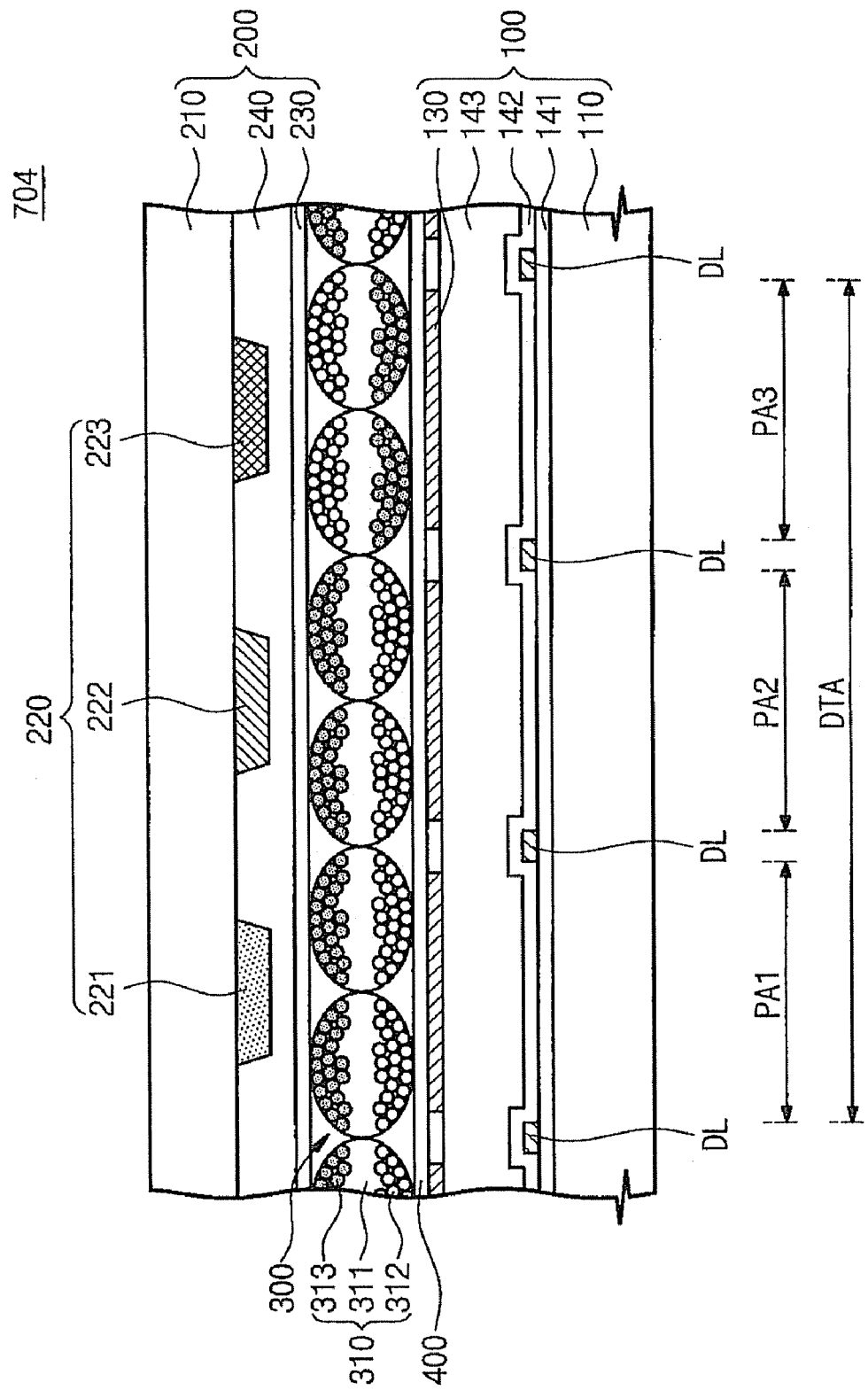
FIG. 6B is a cross-sectional schematic diagram view taken along line IV-IV' in FIG. 6A.

FIG. 6A is a top plan schematic diagram view of an EPD 704 according to still another embodiment of the present invention, and FIG. 6B is a cross-sectional schematic diagram view taken along line IV-IV' in FIG. 6A. However, the same elements illustrated in FIGS. 6A and 6B as those illustrated in FIGS. 1A and 1B are designated with the same reference numerals, and thus detailed descriptions of the same elements will be omitted.

Referring now to FIGS. 6A and 6B, the EPD 704 includes a first display substrate 100, a second display substrate 200 which faces the first display substrate 100 and an electrophoretic layer 300 interposed between the first and second display substrates 100 and 200. The first display substrate 100 includes a first base substrate 110, a plurality of gate lines GL, a plurality of data lines DL, TFTs 120 and pixel electrodes 130. In exemplary embodiments, the first base substrate 110 includes a plurality of pixel areas defined in an array form. The first display substrate 100 further includes a gate insulating layer 141, a protective layer 142 and an organic insulating layer 143.

The second display substrate 200 is aligned on the first display substrate 100. The second display substrate 200 includes a second base substrate 210 which faces the first base substrate 110 and a color filter layer 220 and a common electrode 230, which are formed on the second base substrate 210. An electrophoretic layer 300 including a plurality of electrophoretic particles is interposed between the pixel electrodes 130 of the first display substrate 100 and the common electrode 230 of the second display substrate 200. The EPD 704 further includes an adhesive member 400. The adhesive member 400 is interposed between the electrophoretic layer 300 and the first display substrate 100 to adhere the electrophoretic layer 300 to the first display substrate 100.

The color filter layer 220 includes color pixels disposed on the second base substrate 210 to correspond to the pixel electrodes 130 in a one-to-one correspondence, and the color pixels partially cover the corresponding pixel electrodes 130. The color pixels alternately include red, green and blue pixels 221, 222 and 223 which are arranged along a second direction D2.

As shown in FIG. 6A, the color pixels are positioned in an area which corresponds to the pixel electrodes 130. In an exemplary embodiment, the color pixels are positioned at central portions of areas corresponding to the pixel electrodes 130. As such, the respective color pixels are completely covered by corresponding pixel electrodes 130. As a result, a misalignment margin is increased as compared to when the red, green and blue pixels 221, 222 and 223 are formed to completely overlap with the corresponding pixel electrodes 130 as described with reference to FIGS. 3A and 3B.

Figure 7:
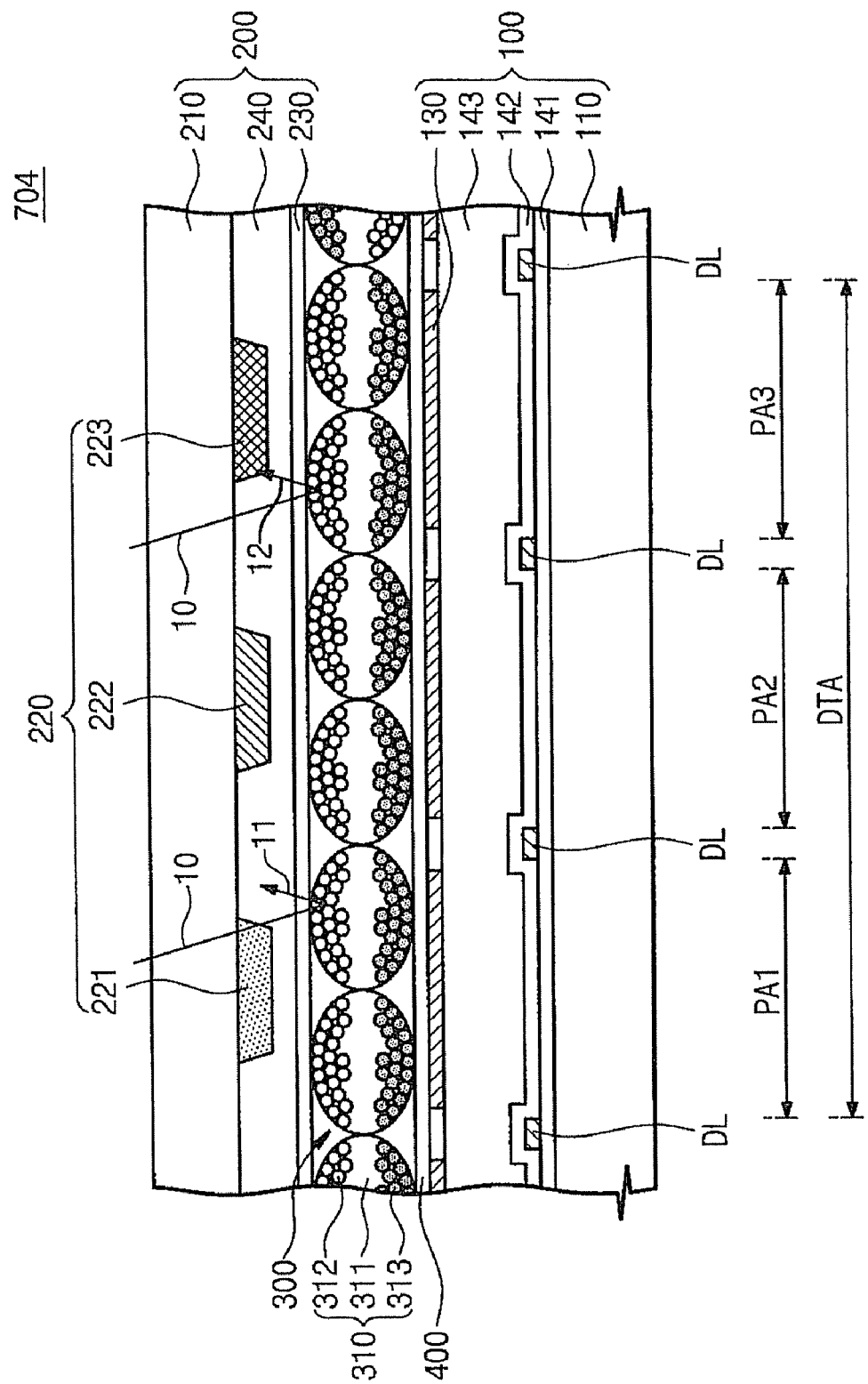
FIG. 7 is a cross-sectional schematic diagram view illustrating a prevention of colors from being mixed in the EPD shown in FIG. 6A.

FIG. 7 is a cross-sectional schematic diagram view illustrating a prevention of colors from being mixed in the EPD 704 shown in FIG. 6A.

When operating the EPD 704, light 10 incident from an external environment of the EPD 704 is reflected onto surfaces of the white particles 312 and then the light is emitted toward the external environment. However, when a color in the area of a color pixel on which the light 10 is incident is different from a color in the area of a color pixel from which the light is emitted, a display quality may be degraded due to a mixture of the colors. For example, when light 10 is incident on the area of the red pixel 221 is emitted from the area of the green pixel 222, red and green colors may be mixed.

However, according to the current exemplary embodiment, the color pixels are formed at central portions of areas formed with the pixel electrodes 130, such that sufficient spacing distances between different color pixels can be ensured. For this reason, the mixture of colors can be prevented or substantially reduced. For example, even though the light 10 incident on the area of the red pixel 221 is emitted beyond the area of the red pixel 221, the emitted light 11 does not violate the area of the green pixel 222 which is adjacent to the red pixel 221. Light 12 formed by the light 10 incident between the green and blue pixels 222 and 223 is emitted from the area of the blue pixel 223, and a mixture of green and blue colors does not occur. As a result, display characteristics of the EPD 704 can be thereby improved.

According to such a display apparatus, color pixels partially cover corresponding pixel electrodes. Thus, when expressing a color of any one of a plurality of color pixels, a color is prevented from being expressed at a peripheral of the color pixel. As a result, a degradation of a purity of the expressed color can be prevented or substantially reduced.

Further, the color pixels include different areas and include a same thickness. Thus, differences in visibilities between the color pixels can be reduced, and a top surface of a second display substrate can be planarized. Accordingly, display characteristics of the display apparatus can be improved.

Although some exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:
1. A display apparatus comprising:
a first base substrate;
pixel electrodes disposed on the first base substrate;
a second base substrate which faces the first base substrate;
color pixels disposed on the second base substrate;
a common electrode disposed on the second base substrate to cover the color pixels; and
an electrophoretic layer including a plurality of electrophoretic particles, the electrophoretic layer being interposed between the pixel electrodes and the common electrode, wherein each of the color pixels comprises one of a red pixel, a green pixel and a blue pixel, and the red pixel, the green pixel, and the blue pixel have different area sizes and are spaced apart from one another at the different distances.

2. The display apparatus as claimed in claim 1, wherein the red pixel, the green pixel, and the blue pixel have different widths when viewed from a cross-sectional view.

3. The display apparatus as claimed in claim 1, wherein the color pixels correspond to the pixel electrodes in a one-to-one correspondence and each color pixel partially covers the corresponding pixel electrode.

4. The display apparatus as claimed in claim 1, wherein the red, green and blue pixels have a same thickness.

5. The display apparatus as claimed in claim 4, wherein the green pixel has a smaller area than an area of each of the red and blue pixels, and the blue pixel has a larger area than an area of each of the red and green pixels.

6. The display apparatus as claimed in claim 5, wherein first, second and third holes are respectively formed in the red, green and blue pixels.

7. The display apparatus as claimed in claim 6, wherein sizes of the first to third holes are inversely proportional to the areas of the color pixel.

8. The display apparatus as claimed in claim 7, wherein the red, green and blue pixels intersect centers of the corresponding pixel electrodes and the red, green and blue pixels are spaced apart from one another.

9. The display apparatus as claimed in claim 5, wherein each color pixel includes a smaller cross-sectional width than the corresponding pixel electrode.

10. The display apparatus as claimed in claim 9, wherein the plurality of electrophoretic particles comprise a plurality of black particles and a plurality of white particles having a different polarity than a polarity of the plurality of black particles.

11. The display apparatus as claimed in claim 10, wherein each of the color pixels is positioned within an area of a corresponding pixel electrode when viewed from a plan view.

12. The display apparatus as claimed in claim 11, wherein each of the color pixels is positioned at a central portion of the area of the corresponding pixel electrode.

13. A display apparatus comprising:
a first base substrate;
pixel electrodes disposed on the first base substrate;
a second base substrate which faces the first base substrate;
a plurality of color pixels disposed on the second base substrate; and
a common electrode disposed on the second base substrate to cover the color pixels,
wherein each of the color pixels comprises one of a red pixel, a green pixel and a blue pixel, and the red pixel, the green pixel, and the blue pixel have different area sizes and are spaced apart from one another at the different distances.

14. The display apparatus as claimed in claim 13, wherein the red pixel, the green pixel, and the blue pixel have different widths when viewed from a cross-sectional view.

15. The display apparatus as claimed in claim 13, wherein the color pixels correspond to the pixel electrodes in a one-to-one correspondence and each color pixel partially covers the corresponding pixel electrode.

16. The display apparatus as claimed in claim 13, wherein a region between two adjacent color pixels is opened so as to expose the second base substrate.

17. The display apparatus as claimed in claim 16, wherein the red, green and blue pixels have a same thickness.

18. The display apparatus as claimed in claim 17, wherein the green pixel has a smaller area than an area of each of the red and blue pixels, and the blue pixel has a larger area than an area of each of the red and green pixels.

19. The display apparatus as claimed in claim 17, further comprising an electrophoretic layer including a plurality of electrophoretic particles, the electrophoretic layer being interposed between the pixel electrodes and the common electrode.

20. The display apparatus as claimed in claim 19, wherein the plurality of electrophoretic particles comprise a plurality of black particles and a plurality of white particles having a different polarity than a polarity of the plurality of black particles.

21. The display apparatus as claimed in claim 20, further comprising a liquid crystal layer interposed between the common electrode and the pixel electrodes.

22. The display apparatus as claimed in claim 21, further comprising an overcoat layer disposed between the color pixels and the common electrode.

* * * * *